(12) United States Patent
Lee et al.

(10) Patent No.: US 12,168,721 B2
(45) Date of Patent: Dec. 17, 2024

(54) COATING COMPOSITION, METHOD FOR MANUFACTURING SAME, AND SEPARATION MEMBRANE COMPRISING SAME

(71) Applicants: W-SCOPE KOREA CO.,LTD., Cheongju-si (KR); W-SCOPE CHUNGJU PLANT CO., LTD., Chungju-si (KR)

(72) Inventors: Ki Woong Lee, Cheongju-si (KR); Dae Yong Yeon, Daejeon (KR); Woo Jin Kim, Seoul (KR); Kwang Ho Choi, Cheongju-si (KR); Jae Yong Choi, Dangjin-si (KR)

(73) Assignees: W-SCOPE KOREA CO., LTD., Chungju-si (KR); W-SCOPE CHUNGJU PLANT CO., LTD., Chungju-si (KR)

( * ) Notice: Subject to any disclaimer, the term of this patent is extended or adjusted under 35 U.S.C. 154(b) by 887 days.

(21) Appl. No.: 17/262,108

(22) PCT Filed: Nov. 1, 2018

(86) PCT No.: PCT/KR2018/013153
§ 371 (c)(1),
(2) Date: Jan. 21, 2021

(87) PCT Pub. No.: WO2020/022562
PCT Pub. Date: Jan. 30, 2020

(65) Prior Publication Data
US 2021/0292592 A1 Sep. 23, 2021

(30) Foreign Application Priority Data
Jul. 24, 2018 (KR) .................. 10-2018-0086078

(51) Int. Cl.
*C08J 3/12* (2006.01)
*C08L 89/00* (2006.01)
(Continued)

(52) U.S. Cl.
CPC ............ *C08J 3/126* (2013.01); *C08L 89/005* (2013.01); *C09D 133/02* (2013.01);
(Continued)

(58) Field of Classification Search
CPC .... C09D 133/02; C08F 283/04; C08F 289/00; C08F 220/06; C08L 89/005; C08L 1/02;
(Continued)

(56) References Cited

U.S. PATENT DOCUMENTS

2005/0277563 A1* 12/2005 Ferguson ................ C08B 37/00
510/267
2015/0171420 A1* 6/2015 Park ...................... H01M 4/485
427/126.3
(Continued)

FOREIGN PATENT DOCUMENTS

CN 102198372 A * 9/2011
CN 102898589 A 1/2013
(Continued)

OTHER PUBLICATIONS

Michaud, David 'how to interpret particle size distribution data' (online), 911Metallurgist, Jul. 29, 2013; [retrieved on Aug. 9, 2024]. Retrieved from the Internet: <URL: https://www.911metallurgist.com/blog/how-to-interpret-particle-size-distribution-data>. (Year: 2013).*

*Primary Examiner* — Sophie Hon
(74) *Attorney, Agent, or Firm* — NKL Law; Jae Youn Kim

(57) ABSTRACT

An embodiment of the present invention provides a coating composition comprising a composite in which a dissociated
(Continued)

natural polymer compound is bound onto at least a portion of the surface of acrylic polymer particles.

7 Claims, 10 Drawing Sheets

(51) Int. Cl.
*C09D 133/02* (2006.01)
*H01M 10/0525* (2010.01)
*H01M 50/403* (2021.01)
*H01M 50/443* (2021.01)
*H01M 50/449* (2021.01)
*H01M 50/489* (2021.01)
*H01M 50/491* (2021.01)

(52) U.S. Cl.
CPC ..... *H01M 10/0525* (2013.01); *H01M 50/403* (2021.01); *H01M 50/443* (2021.01); *H01M 50/449* (2021.01); *H01M 50/489* (2021.01); *H01M 50/491* (2021.01)

(58) Field of Classification Search
CPC .......... C08K 3/22; C08B 37/00; H01M 50/42; H01M 50/429; C08J 3/126
See application file for complete search history.

(56) References Cited

U.S. PATENT DOCUMENTS

2016/0301052 A1* 10/2016 Adams ................ H01M 50/449
2016/0325230 A1* 11/2016 Kofler .................... B01D 61/46

FOREIGN PATENT DOCUMENTS

| CN | 112469789 B | * | 7/2022 | ............ C08F 120/06 |
|----|----|----|----|----|
| JP | 2005330387 A | * | 12/2005 | |
| KR | 10-0348371 B1 | | 2/2005 | |
| KR | 10-0752245 B1 | | 8/2007 | |
| KR | 10-2009-0103222 A | | 10/2009 | |
| KR | 10-2011-0043935 A | | 4/2011 | |
| KR | 10-2013-0114152 A | | 10/2013 | |
| KR | 10-2014-0029799 A | | 3/2014 | |
| KR | 10-1801049 B1 | | 11/2017 | |

* cited by examiner

COATING COMPOSITION, METHOD FOR MANUFACTURING SAME, AND SEPARATION MEMBRANE COMPRISING SAME

TECHNICAL FIELD

The present invention relates to coating composition, method for preparing the same, and separation membrane comprising the same.

BACKGROUND ART

Lithium secondary batteries are widely used as power sources for various electric products requiring miniaturization and weight reduction, such as smartphones, notebook computers, tablet PCs, and the like, and as the fields of application extend to smart grids and medium-large batteries for electric vehicles, the development of a lithium secondary cell having a large capacity, a long life, and high stability is required.

In order to improve the above-mentioned stability, a separation membrane in which fine pores are formed by separating the positive electrode and the negative electrode to prevent an internal short circuit and to facilitate the migration of lithium ions during charging and discharging is used, and polyolefin-based polyethylene or polypropylene is used as representative material for such a separation membrane.

The non-ideal behavior of the battery may cause mechanical shrinkage or damage of the separation membrane when the separation membrane is exposed to a high temperature environment, in this case, the positive electrode and negative electrode come into contact and the battery ignites. In order to overcome such problems, a technique for suppressing the thermal shrinkage of a separation membrane and ensuring the stability of a battery is required. In particular, the standard of stability required for a separation membrane has been increased while the market has extended from a small battery to a medium-large battery, and in order to satisfy this, a method of increasing the thermal resistance of a separation film by mixing and coating inorganic particles having high thermal resistance with organic binder having an adhesive property is known. However, the separation membrane manufactured in the related art cannot secure the desired adhesive strength, and it is difficult for the separation membrane to be applied collectively to separation membranes having various shapes and sizes. Therefore, it is necessary to develop a separation membrane having high heat resistance and excellent adhesive strength.

In addition, lithium contained in the secondary battery can rapidly react with moisture to cause an explosion. In particular, a separation membrane using an aqueous slurry needs to reduce moisture content in order to prevent such explosion accidents.

Korean Patent No. 10-1801049, Korean Publication No. 10-2013-0114152, etc. disclose a configuration in which a natural polymer compound is used as viscosity modifier for a slurry composition to change the viscosity of the slurry to increase the dispersibility of particles or to increase coatability. However, the configuration described in the above patent is a simple mixture of a natural polymer compound with a binder or the like, and the storage stability of the produced slurry is poor, and there is no effect of improving heat resistance or moisture content characteristics.

(Related Art Document 1) Korean Patent No. 10-1801049
(Related Art Document 2) Korean Patent Publication No. 10-2013-0114152.

Technical Problem

The present invention has been made to solve the above-mentioned problems of the related art, and an object of the present invention is to provide a coating composition having a low moisture content and excellent heat resistance and adhesive strength.

Another object of the present invention is to provide a separation membrane having excellent stability by applying the coating composition.

Technical Solution

One aspect of the present invention provides a coating composition comprising a composite in which a dissociated natural polymer compound is bound to at least a portion of the surface of acrylic polymer particles.

In one embodiment, the coating composition may be water-soluble.

In one embodiment, the natural polymer compound may be one selected from the group consisting of a plant-based polymer compound, an animal-based compound, a microbial-based polymer compound, and a combination of two or more thereof.

In one embodiment, the solid content of the coating composition may be 5 to 25% by weight.

In one embodiment, the pH of the coating composition may be in a range of 4 to 5.

Another aspect of the present invention provides method for preparing a coating composition, the method comprising: (a) adding water and a natural polymer compound into a reactor and adjusting pH to dissociate the natural polymer; and (b) adding a water-soluble initiator and an acrylic monomer into the reactor and allowing the resulting mixture to react.

In one embodiment, the acrylic monomer may be saponified prior to the addition.

In one embodiment, the concentration of the natural polymer compound may be 1% to 10% by weight.

Another aspect of the present invention provides a separation membrane comprising a coating layer formed by applying the coating composition according to any one of claims 1 to 5 onto at least one surface of a polyolefin-based porous substrate.

In one embodiment, the moisture content of the coating layer may be 1,000 ppm or less.

In one embodiment, the thermal shrinkage rate of the separation membrane at 150° C. in the machine and transverse directions may be 10.0% or less, respectively.

Advantageous Effects

According to one aspect of the present invention, it is possible to provide a coating composition having a low moisture content and excellent heat resistance and adhesive strength.

According to another aspect of the present invention, a separation membrane excellent in stability can be provided by applying the coating composition.

It should be understood that the effects of the present invention are not limited to the above-described effects, and include all effects derivable from the constitution of the present invention described in the detailed description or the claims of the present invention.

MODES FOR THE PRACTICE OF THE INVENTION

Figure 1:
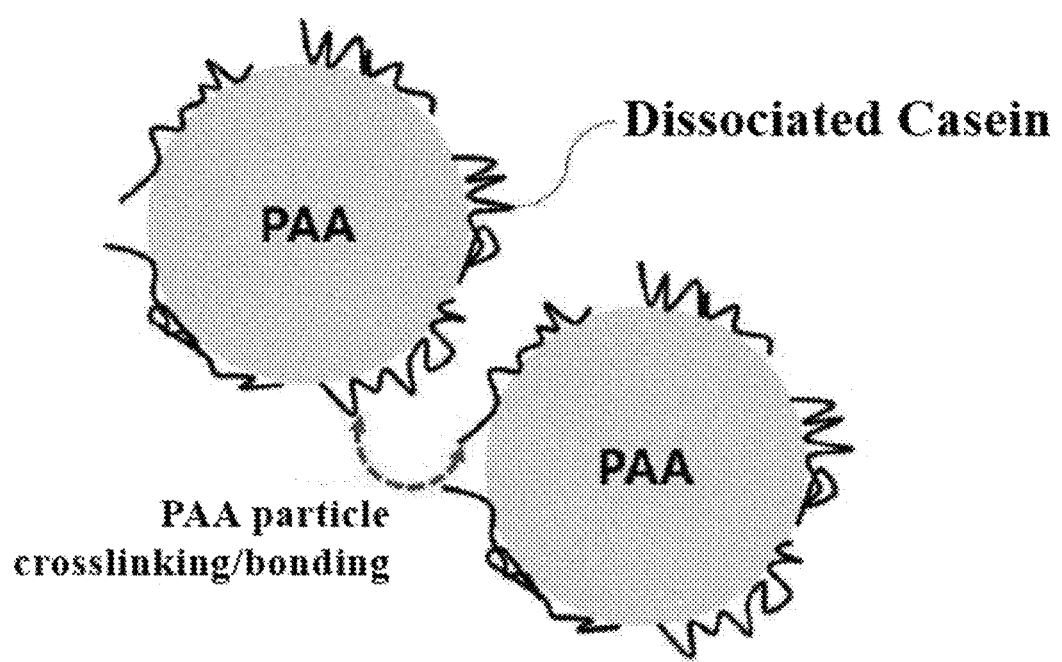
FIG. 1 shows an outline of a PAA-casein composite comprised in a coating composition according to one embodiment of the present invention, wherein the composite is dissociated casein bound to a surface of polyacrylic acid.

The present invention will now be described with reference to the accompanying drawings. However, the present invention may be embodied in many different forms and is therefore not limited to the embodiments described herein. In the drawings, parts not related to the description are omitted for clearly describing the present invention, and similar parts are denoted by similar figure numerals throughout the specification.

Throughout the specification, when a part is referred to as being "connected" to another part, it includes not only the case of being "directly connected" but also the case being "indirectly connected", with another member interposed therebetween. Also, when a part is said to "comprise" a certain component, it means that it may not exclude other components but may further comprise other components unless otherwise specified.

Embodiments of the present invention will now be described in detail with reference to the accompanying drawings.

The coating composition, which is one aspect of the present invention, may comprise a composite in which a dissociated natural polymer compound is bound to at least a portion of the surface of an acrylic polymer particle.

FIG. 1 shows a case where the acrylic polymer in the composite is polyacrylic acid (PAA) and the natural polymer compound is casein. Referring to FIG. 1, the dissociated natural polymer compound is bound to a portion of the surface of the acrylic polymer particles. The dissociated natural polymeric compound may promote crosslinking and/or bonding between the composites, and these properties may improve the heat resistance and adhesive strength of the slurry containing the composite.

The coating composition may be water-soluble.

"Non-aqueous coating liquid" is a coating liquid obtained by dissolving a water-insoluble binder in an organic solvent, and has a disadvantage that although it is excellent in heat resistance and adhesive strength, a coating layer which is non-uniform due to gelation in a drying process can be formed, and thus a separate post-treatment is required, and it is difficult to shorten a processing speed due to the risk of explosion during drying, and storage stability is poor due to the volatility of the organic solvent and causes environmental pollution.

"Aqueous coating liquid" is a coating liquid obtained by dissolving a water-soluble binder in water, and is more economical and environmentally friendly than a non-aqueous coating liquid, but a general aqueous coating liquid has disadvantages of poor adhesive strength, and decreasing air permeability by closing pores of a separation membrane. However, the coating composition of the present invention may have excellent heat resistance and adhesive strength compared to conventional aqueous coating solutions.

The natural polymer compound may be one selected from the group consisting of a plant-based polymer compound, an animal-based polymer compound and a microbial-based polymer compound as well as a combination of two or more thereof, and may preferably be the animal-based polymer compound.

The animal-based polymer compound may be one selected from the group consisting of collagen, casein, albumin, gelatin, and a combination of two or more thereof.

The casein is a protein obtainable from milk and consists of α-casein, β-casein, κ-casein and traces of other caseins. The casein used in the present invention may have a ratio of α, β and κ of 40 to 50:20 to 40:10 to 15, respectively.

The solid content of the coating composition may be 5 to 25% by weight, preferably 10 to 20% by weight and more preferably 15 to 20%. When the solid content of the coating composition is less than 5% by weight, adhesive strength may be lowered, and when it is more than 25% by weight, viscosity may be excessively high, resulting in poor coating properties.

The pH of the coating composition may be in a range of 4 to 5. If the pH of the composition is outside this range, the composite may not be formed.

In another aspect of the present invention, method for preparing a coating composition may include the steps of: (a) adding water and a natural polymer compound into a reactor and adjusting pH to dissociate the natural polymer; and (b) adding a water-soluble initiator and an acrylic monomer into the reactor and allowing the resulting mixture to react.

The pH of the reactor in step (a) can be adjusted to a value capable of dissociating the natural polymeric compound. For example, if the natural polymeric compound is casein, the pH of step (a) may be less than or equal to 3 or greater than or equal to 7.

As the water-soluble initiator, ammonium persulfate (APS), potassium persulfate (KPS) and similar initiators can be used.

The acrylic monomer may be saponified before being added in step (b). When the acrylic monomer is added after being saponified, the miscibility with the dissociated natural polymer compound can be improved, and the composite can be more easily formed.

The concentration of the natural polymer compound may be 1% to 10% by weight. When the concentration is less than 1% by weight, the effect of improving heat resistance and adhesive strength may be reduced, and when it is more than 10% by weight, it may be gelled and the use thereof may not be possible.

A separation membrane, which is another aspect of the present invention, may comprise a coating layer formed by applying the coating composition according to any one of claims 1 to 5 onto at least one surface of a polyolefin-based porous substrate.

The thermal shrinkage rate in the transverse and machine directions of the separation membrane may be 5.0%, preferably 0.55% or less at 105° C. and 5.0%, and preferably 1.2% or less at 120° C. depending on the temperature. In addition, the thermal shrinkage rate of the separation membrane at 150° C. in the transverse and machine directions may be 10.0% or less, preferably 5.0% or less and more preferably 1.0% or less. The coating layer comprising the coating composition of the present invention can improve the heat resistance of the separation membrane and reduce the thermal shrinkage rate of the separation membrane.

The moisture content of the coating layer may be 1,000 ppm or less, preferably 500 ppm or less. The natural polymer compound bound to the surface of the acrylic polymer particles can prevent the acrylic polymer from containing moisture and reduce the moisture content.

Hereinafter, embodiments of the present invention will be described in more detail. However, the following experimental results are only representative experimental results of the above-described examples, and the scope and content of the present invention cannot be reduced or limited by the examples and the like. The respective effects of the various embodiments of the present invention, which are not explicitly set out below, will be described in detail in the relevant sections.

The following experimental results are obtained by preparing coating compositions and separation membranes by varying the composition content according to one embodiment of the present invention, and comparatively analyzing each of the physical properties.

1. Coating Composition

Preparation Examples and Comparative Preparation Examples

An aqueous casein solution was charged into a reactor and stirred. Ammonium ($NH_4^+$) was added so that the pH of the reactor was 8, and thus the casein was dissociated. An acrylic acid (AA) monomer saponified with $NH_4^+$ was added dropwise to a first feeder at the upper part of the reactor, and ammonium persulfate was added dropwise to the second feeder and reacted. After completion of the reaction, a coating composition was obtained.

Figure 2:
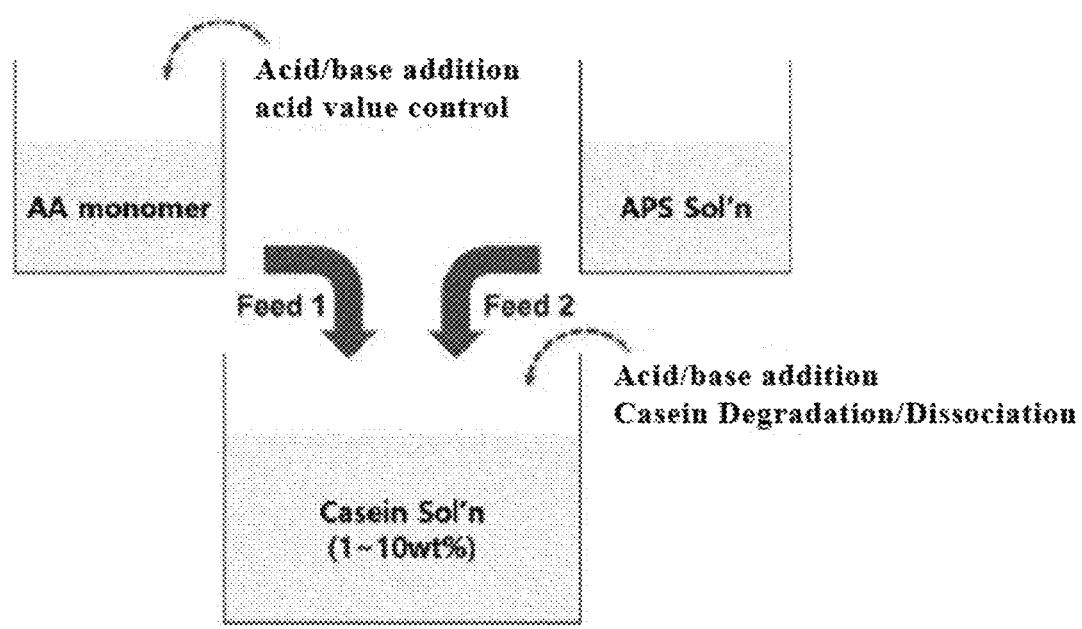
FIG. 2 shows a schematic diagram of a reactor for preparing a coating composition according to one embodiment of the present invention.

FIG. 1 shows a schematic representation of a coating composition comprising a composite in which dissociated casein is bound to at least a portion of the surface of a polyacrylic acid particle and FIG. 2 shows a method for preparing the coating composition.

Comparative Preparation Example 7

According to the above Patent Documents 1 and 2, a natural polymer compound and a particulate polymer were mixed. A coating composition was prepared by cold mixing a 10 wt % aqueous casein solution and a 20 wt % polyacrylic acid solution at a weight ratio of 1:9, respectively, but could not be used for coating the separation membrane due to the generation of excessive precipitate.

Figure 3:
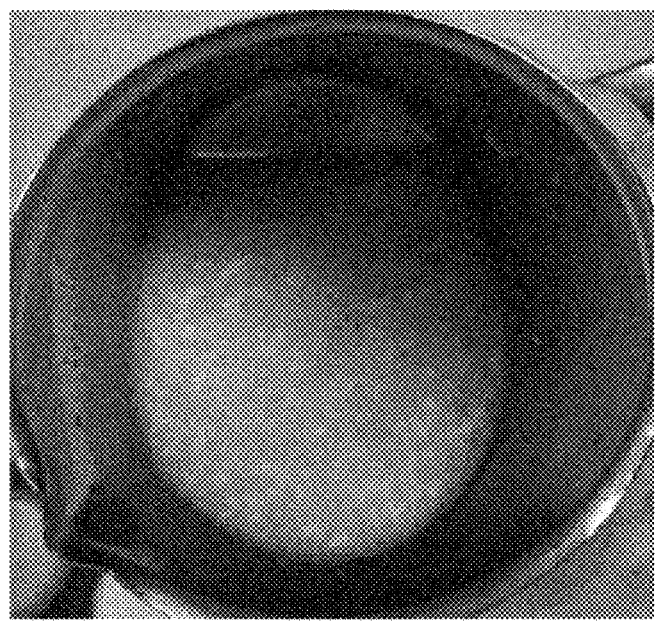
FIG. 3 is a result of cold mixing an aqueous casein solution and a polyacrylic acid solution.
Figures 4A, 4B:
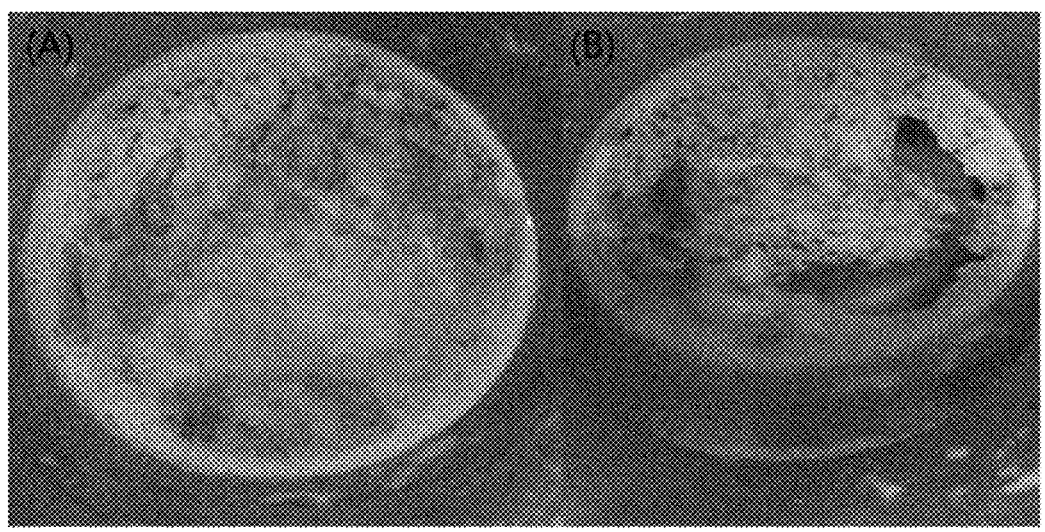
FIG. 4A shows a state in which casein is agglomerated as a result of allowing a mixture prepared by cold mixing an aqueous casein solution and a polyacrylic acid solution to stand for 2 days.
FIG. 4B shows that the casein and the polyacrylic acid in the mixture are separated from each other.

Referring to FIG. 3, which is immediately after mixing the composition, casein and polyacrylic acid were poorly dispersed upon simple mixing to form a mass, which hindered the stirring of the reactor impeller. FIG. 4 shows a state on day 2 after mixing the composition of the above Comparative Preparation Example 7, and referring to FIGS. 4A and 4B, it can be confirmed that casein alone is separately aggregated and separated, and the composition has poor storage stability.

The composition and properties of the coating compositions prepared according to the above Preparation Examples and Comparative Preparation Examples are shown in Tables 1 and 2 below.

TABLE 1

| Item | Prep. Ex. 1 | Prep. Ex. 2 | Prep. Ex. 3 | Prep. Ex. 4 | Prep. Ex. 5 |
|---|---|---|---|---|---|
| Casein content (wt %) | 1 | 3 | 5 | 7 | 10 |
| Solids (wt %) | 20.9 | 21.1 | 21.1 | 21.3 | 22.6 |
| pH | 4.5 | 4.5 | 4.4 | 4.5 | 4.5 |
| Viscosity (cps@25° C.) | 440 | 470 | 1,320 | 3,370 | 13,000 |

TABLE 2

| Item | Comp. Prep. Ex. 1 | Comp. Prep. Ex. 2 | Comp. Prep. Ex. 3 | Comp. Prep. Ex. 4 | Comp. Prep. Ex. 5 | Comp. Prep. Ex. 6 | Comp. Prep. Ex. 7 |
|---|---|---|---|---|---|---|---|
| Casein content (wt %) | 0 | 10 | 10 | 15 | 15 | 20 | 10 |
| Solids (wt %) | 20.9 | 20 | 20 | 20 | 15.7 | 14.8 | — |
| pH | 4.7 | 2.5 | 5.7 | — | 4.5 | 4.3 | — |
| Viscosity (cps@25° C.) | 190 | — | — | — | 330 | 4,100 | — |

Referring to Tables 1 and 2, it can be confirmed that the viscosity of the coating composition increases with increasing casein and solids content.

(1) pH

Figure 5:
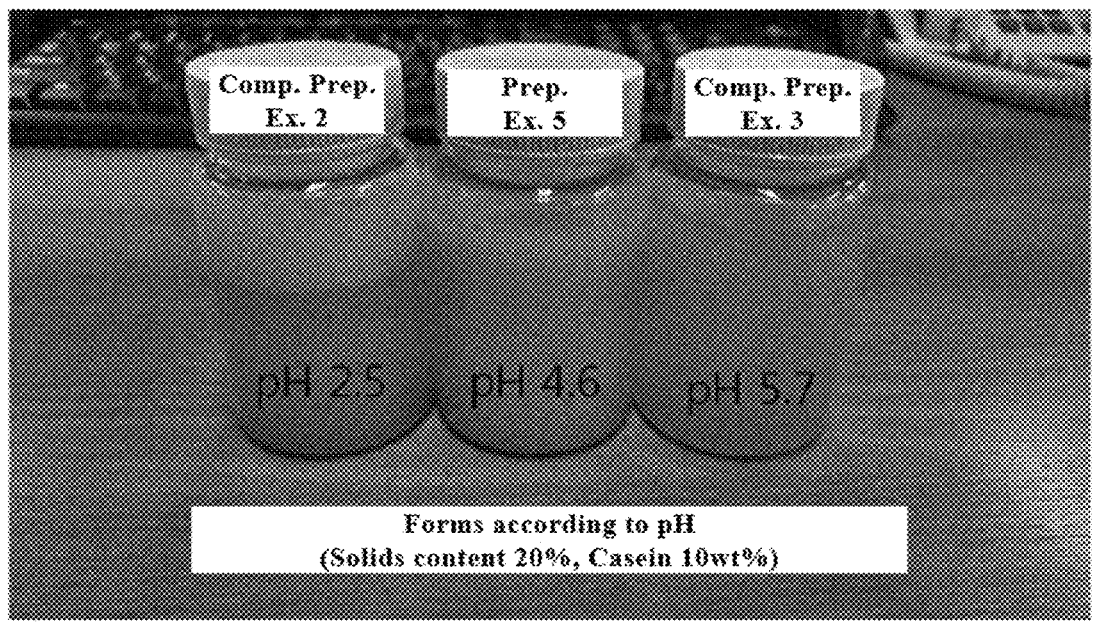
FIG. 5 shows a mutual comparison after the pH is changed and the coating composition is prepared.
Figure 6:
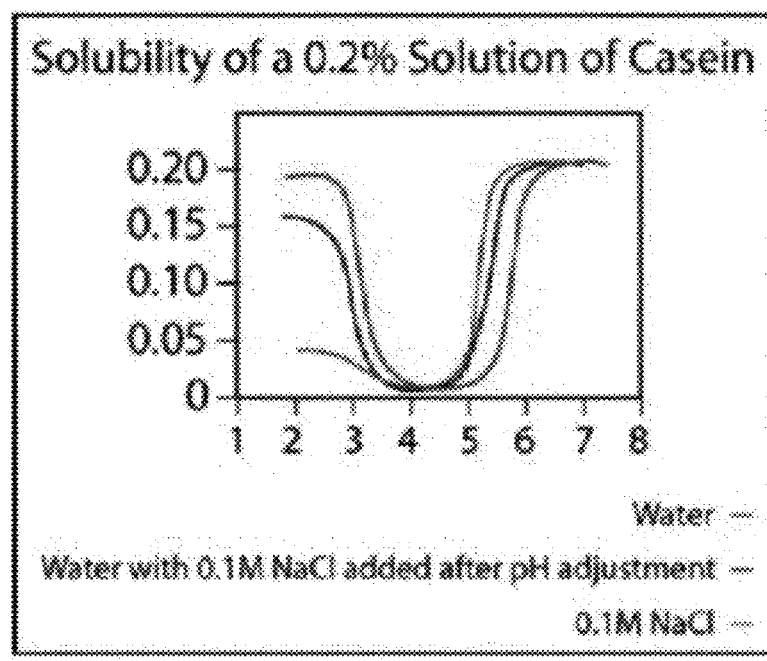
FIG. 6 shows the solubility curve of an aqueous casein solution.

FIG. 5 shows a comparison of the coating compositions of Comparative Preparation Examples 2 and 3 and Preparation Example 5 having different pHs. and FIG. 6 shows the solubility curve of casein according to pH.

Referring to FIGS. 5 and 6, the coating composition of Preparation Example 5 formed particles and thus had a milky formulation, but the coating compositions of Comparative Preparation Examples 2 and 3 formed a solution due to the increase in casein solubility depending on pH and could not obtain the desired properties.

(2) Casein Content

Figure 7:
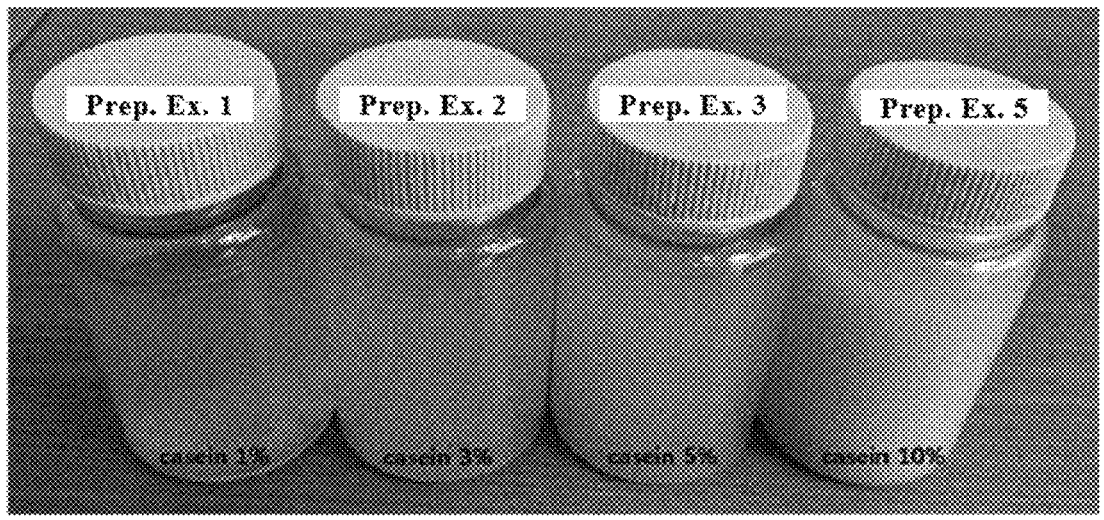
FIG. 7 shows a mutual comparison after the casein content is changed and the coating composition is prepared.

FIG. 7 shows a view of the coating composition of the Preparation Example having a casein content of 1% to 10% by weight, and it could be visually confirmed that the opacity of the composition also increases depending on the content of casein. The coating composition of Comparative Preparation Example 4 with a casein content of 15% could not be used for separation membrane coating due to gelation.

(3) Solid Content

Figure 8:
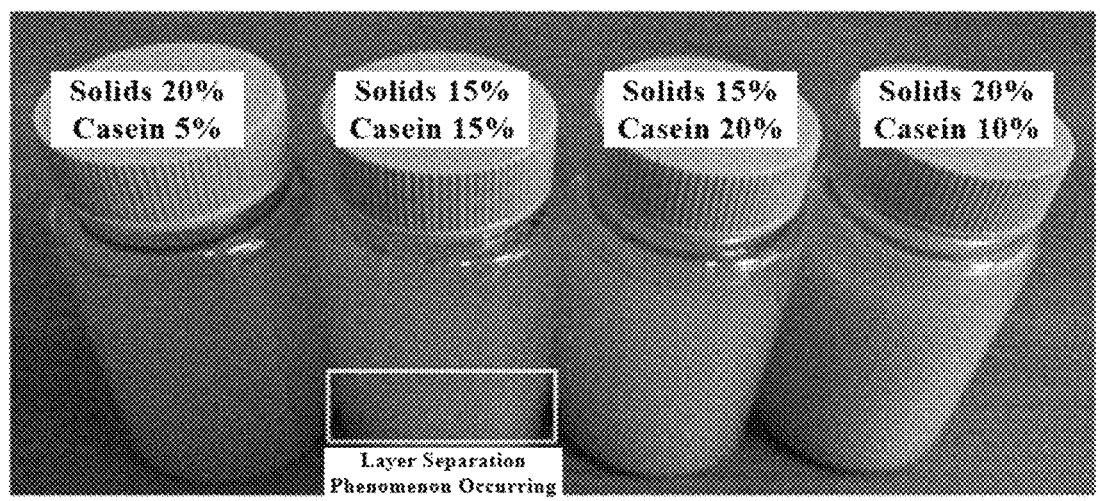
FIG. 8 shows a mutual comparison after the solid content is changed and the coating composition is prepared

FIG. 8 shows a comparison of the coating compositions of Comparative Preparation Examples 5 and 6 having a solid content of 15% by weight with the coating composition of Preparation Examples 3 and 5. The coating composition of Comparative Preparation Example 5 had poor storage stability, resulting in a layer separation phenomenon, and thus viscosity was measured to be low. The coating composition of Comparative Preparation Example 6 had poor reactivity because 333 mg of unreacted grit was formed per 100 g.

2. Separation Membrane

Examples 1 to 5 and Comparative Examples 1 to 2

A aqueous coating slurry comprising 30 parts by weight of solids consisting of 2% by weight of a coating composition, 3% by weight of carboxymethylcellulose (CMC) and 95% by weight of alumina, and 70 parts by weight of water was coated to thickness of 4 μm based on a cross section on a porous polyethylene fabric having a thickness of 14 μm and an air permeability of 170 sec/100 mL using a bar coating method to manufacture a separation membrane.

The properties of the aqueous coating slurry used in the above Examples and Comparative Examples are shown in Table 3 below. The coating composition of Comparative Preparation Example 5 was sufficiently stirred before use to remove the layer separation phenomenon and then used.

EXPERIMENTAL EXAMPLE

Figure 9:
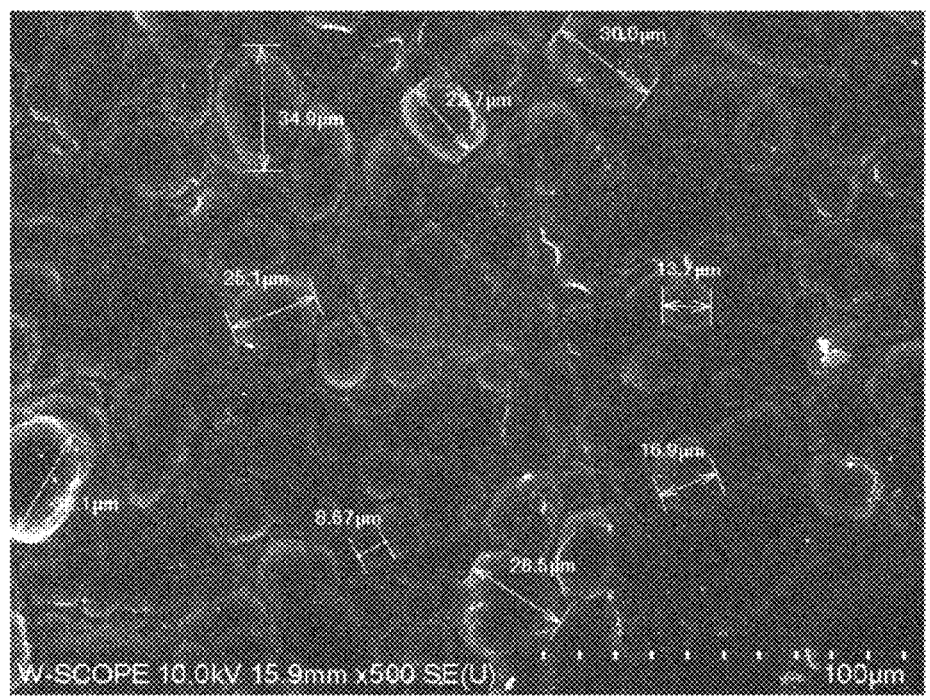
FIG. 9 shows a scanning electron microscope image of particles of a coating composition prepared according to Preparation Example 5 of the present invention.
Figure 10:
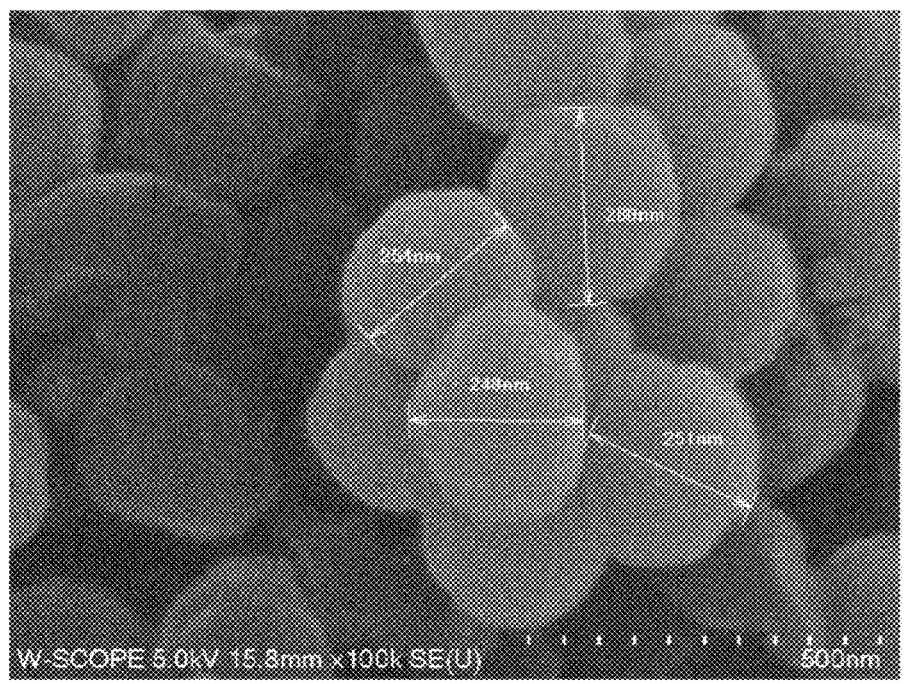
FIG. 10 shows a scanning electron microscope image of particles of a coating composition prepared according to Comparative Preparation Example 5.
Figure 11:
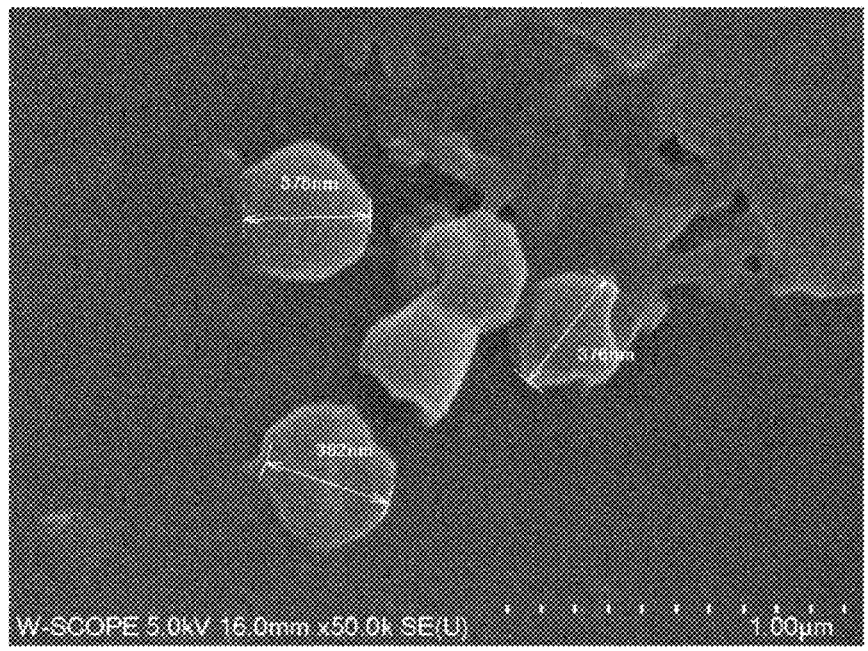
FIG. 11 shows a scanning electron microscope image of particles of a coating composition prepared according to Comparative Preparation Example 6.
Figure 12:
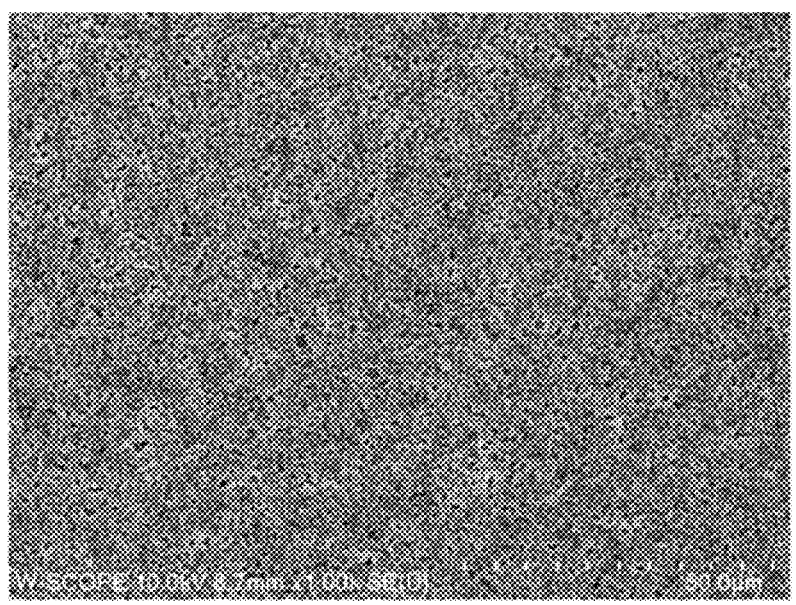
FIG. 12 shows a scanning electron microscope image of a coating layer of a separation membrane prepared according to Example 5 of the present invention, the coating layer being observed at a magnification of 1,000×.
Figure 13:
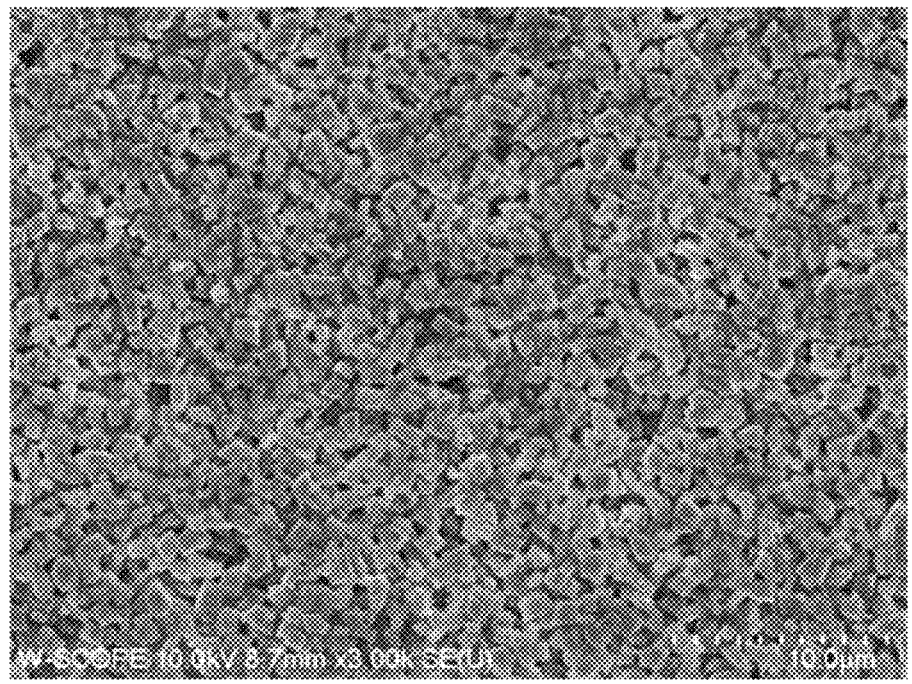
FIG. 13 shows a scanning electron microscope image of a coating layer of a separation membrane prepared according to Example 5 of the present invention, the coating layer being observed at a magnification of 3,000×.
Figure 14:
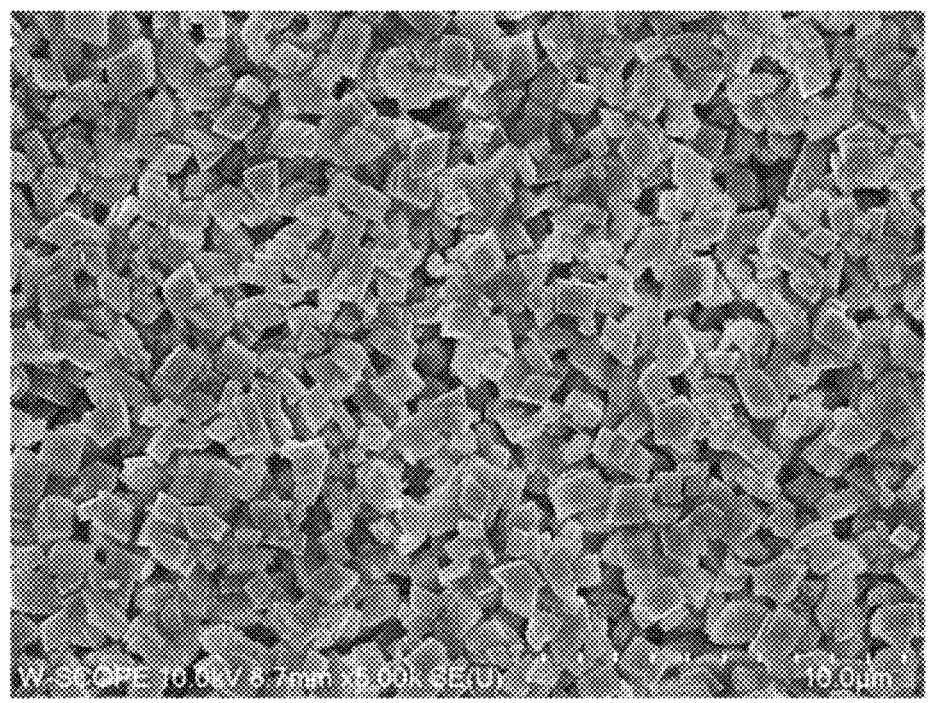
FIG. 14 shows a scanning electron microscope image of a coating layer of a separation membrane prepared according to Example 5 of the present invention, the coating layer being observed at a magnification of 5,000×.
Figure 15:
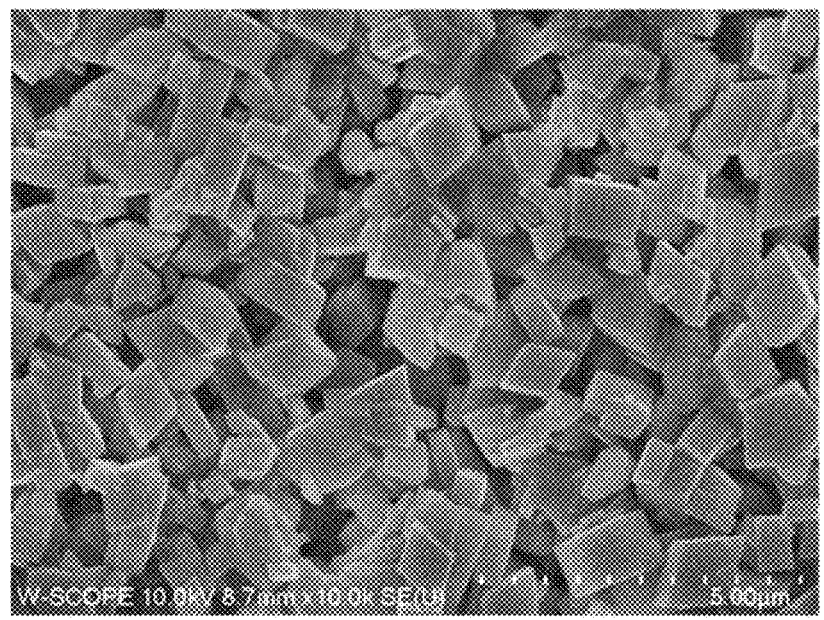
FIG. 15 shows a scanning electron microscope image of a coating layer of a separation membrane prepared according to Example 5 of the present invention, the coating layer being observed at a magnification of 10,000×.

Further, in order to confirm the particle size of the formed particles, the aqueous coating slurry prepared from the coating compositions of Preparation Example 5 and Comparative Preparation Examples 5 and 6 was photographed with a scanning electron microscope (SEM) and the results are shown in FIGS. 9 to 11.

TABLE 3

| Item | Ex. 1 | Ex. 2 | Ex. 3 | Ex. 4 | Ex. 5 | Comp. Ex. 1 | Comp. Ex. 2 |
|---|---|---|---|---|---|---|---|
| Coating composition | Prep. Ex. 1 | Prep. Ex. 2 | Prep. Ex. 3 | Prep. Ex. 4 | Prep. Ex. 5 | Comp. Prep. Ex. 1 | Comp. Prep. Ex. 5 |
| D mean (μm) | 1.61 | 1.62 | 1.61 | 1.62 | 1.63 | 1.64 | 1.69 |
| D10 (μm) | 0.92 | 0.92 | 0.92 | 0.92 | 0.93 | 0.91 | 0.93 |
| D50 (μm) | 1.31 | 1.31 | 1.31 | 1.32 | 1.34 | 1.35 | 1.36 |
| D90 (μm) | 2.99 | 3.00 | 3.01 | 3.02 | 3.04 | 2.68 | 3.04 |
| pH | 7.14 | 7.16 | 7.19 | 7.22 | 7.24 | 7.81 | 7.21 |
| Viscosity (cps@25° C.) | 30 | 30 | 30 | 31 | 32 | 11 | 27 |

In Table 3, D mean, D10, D50, and D90 are values obtained by measuring the distribution of particles of the slurry using a particle size analyzer. D mean is the average value of the particle sizes and Dx is the particle size value corresponding to x %.

Referring to Table 3, it can be confirmed that D10 and D50 are constant regardless of the casein content, but in the case of D90, Comparative Example 1, which does not include casein, is about 10% smaller than the other slurries. In addition, Comparative Example 1 has pH of about 0.6 higher and viscosity of about 20 cps lower than those of the other slurries.

Referring to FIG. 9, it can be confirmed that casein on the surface of the PAA-casein composite in Preparation Example 5 promoted the binding between composites to form particles of 8.67 to 34.9 sm. Comparing FIGS. 10 and 11 photographed by enlarging the particles of Comparative Preparation Examples 5 and 6 by 50,000 to 100,000×, it can be confirmed that Comparative Preparation Example 5 having a casein content of 15% has a PAA-casein composite particle size of 248 to 280 nm, and Comparative Preparation Example 6 having a casein content of 20% has a PAA-casein composite particle size of 376 to 382 nm, and the higher the casein content, the larger the particle size of the PAA-casein composite.

From the above results, it can be confirmed that casein in the slurry forms a composite with a polyacrylic acid particle to increase the size thereof, and induces binding between the composites to form aggregated particles, thereby increasing viscosity and pH.

Physical properties of the separation membranes manufactured according to the above Examples and Comparative Examples were measured and shown in Table 4 below.

Further, the slurry coating layer of the separation membrane manufactured according to Example 5 was photographed by SEM and the results thereof are shown in FIGS. 12 to 15.

TABLE 4

| Item | Ex. 1 | Ex. 2 | Ex. 3 | Ex. 4 | Ex. 5 | Comp. Ex. 1 | Comp. Ex. 2 |
|---|---|---|---|---|---|---|---|
| Thickness (μm) | 18.2 | 18.2 | 18.1 | 18.0 | 18.0 | 18.0 | 18.3 |
| Air permeability (sec/100 mL) | 190.3 | 191.9 | 194.1 | 196.6 | 200.2 | 189.3 | 190.3 |
| Amount of coating (g/m²) | 5.19 | 5.20 | 5.21 | 5.21 | 5.23 | 5.23 | 5.58 |
| Thermal shrinkage rate at 150° C. (%) | MD 1.0/ TD 1.0 | MD 1.0/ TD 1.0 | MD 1.0/ TD 1.0 | MD 1.0/ TD 1.0 | MD 1.0/ TD 1.0 | MD 3.0/ TD 3.5 | MD 0.5/ TD 0.5 |
| Moisture content (ppm) | 501.0 | 499.6 | 497.3 | 494.2 | 492.0 | 567.4 | 494.7 |

When the thermal shrinkage rate of the separation membrane is high, the separation membrane is deformed at the time of heat generation of the battery, and it is highly likely that a short circuit occurs. The lithium contained in the lithium secondary battery can explode upon contact with moisture, and when the moisture content of the separation membrane is high, the stability of the battery is degraded.

Referring to Table 4, it can be confirmed that the coating composition of the present invention has a significantly improved thermal shrinkage rate at 150° C. and a significantly improved moisture content and thus improved stability as compared with the separation membrane of Comparative Example 1 containing no casein.

Referring to FIGS. 12 to 15, when a slurry comprising the coating composition of the present invention was coated onto a porous fabric, the coating layer was preferably formed in a form that can ensure air permeability.

A specimen having length of 10 mm was taken from the separation membranes prepared according to Example 5 and Comparative Examples 1 and 2 and was subjected to thermomechanical analysis to measure the shutdown and meltdown temperatures and the thermal shrinkage rate at 105° C., 120° C. and 130° C. The results was shown in Table 5 below and FIGS. 16 and 17. The temperature was measured while raising a temperature at a rate of 10° C./min in a temperature range of 20 to 200° C.

TABLE 5

| Item | Shut-down Temp. (° C.) | Melt-down Temp. (° C.) | Thermal shrinkage rate at 150° C. (%) | Thermal shrinkage rate at 120° C. (%) | Thermal shrinkage rate at 130° C. (%) |
|---|---|---|---|---|---|
| 14 μm Porous fabric | 137.5 | 145.5 | 1.18 | 3.34 | 15.05 |
| Ex. 5 | 134.3 | 141.0 | 0.54 | 1.17 | 3.83 |
| Comp. Ex. 1 | 133.3 | 142.1 | 0.79 | 1.69 | 3.68 |
| Comp. Ex. 2 | 133.1 | 141.9 | 0.60 | 1.42 | 4.05 |

Figure 16:
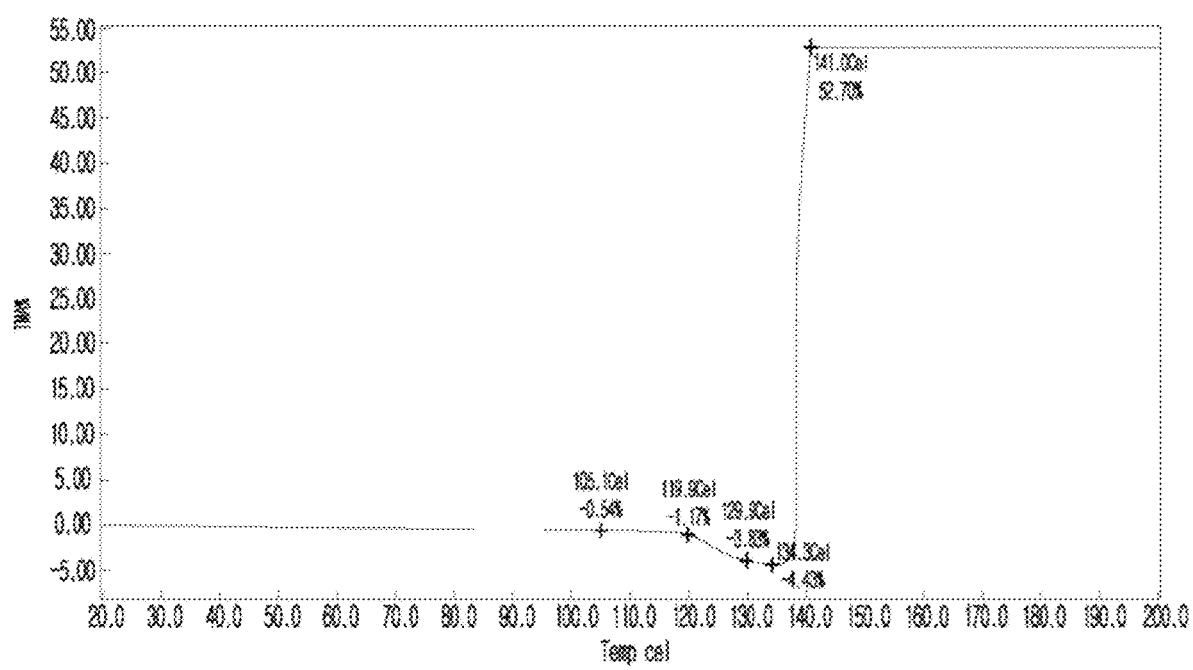
FIG. 16 shows the results of thermomechanical analysis of the separation membrane prepared according to Example 5 of the present invention.
Figure 17:
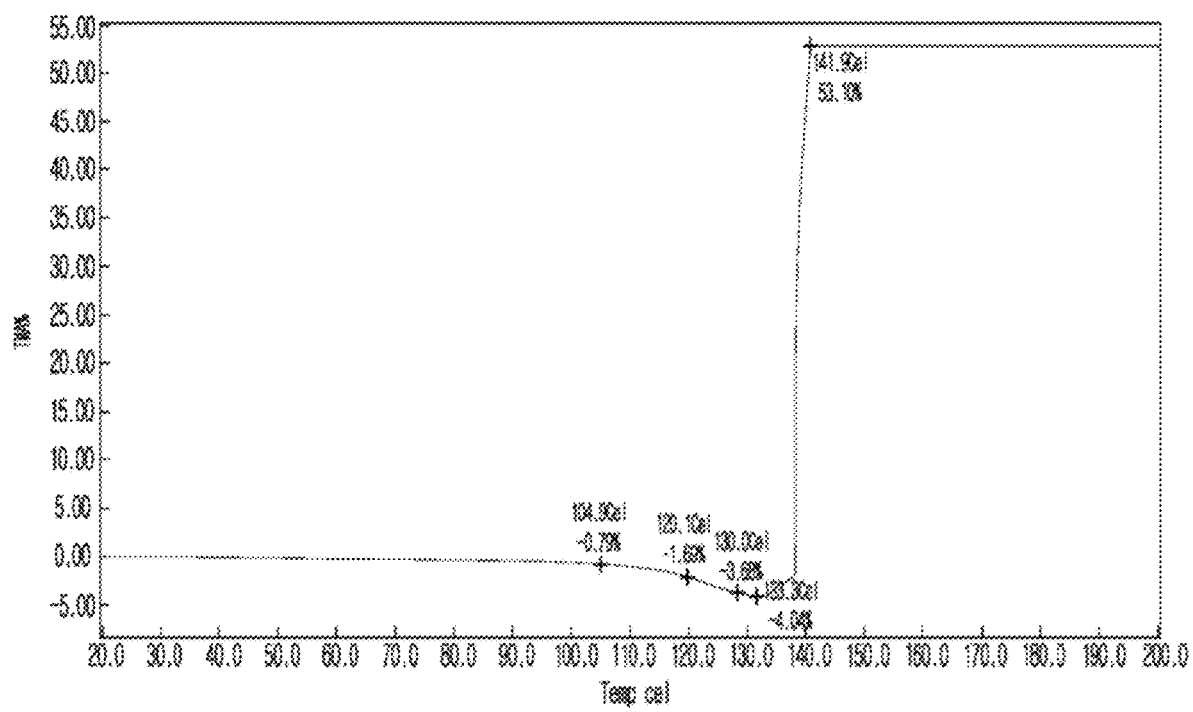
FIG. 17 shows the results of thermomechanical analysis of the separation membrane prepared according to Comparative Example 1.

Referring to Table 5 and FIGS. 16 and 17, the thermal shrinkage rate of all three types of separation membranes compared to the porous fabric was improved, and the thermal shrinkage rate at 105° C. and 120° C. of the separation membrane of Example 5 was the best. The shutdown temperature and meltdown temperature were about 4° C. lower for the separation membranes than for the porous fabric.

Test methods for each of the physical properties measured in the present invention are as follows. Measurements were made at room temperature (25° C.) unless otherwise stated.

Thickness (μm): The thickness of the separation membrane specimen was measured using a precision thickness gauge.

Air permeability (Gurley, see/100 mL): The time taken for 100 mL of air to pass through a separation membrane specimen having a diameter of 29.8 mm at measurement pressure of 0.025 MPa was measured using the Gurley densometer EGO2-5 model from Asahi Seiko.

Coating amount (g/m2): It was calculated by dividing the weight of the coated slurry by the area of the porous fabric.

Thermal shrinkage rate at 150° C. (%): A separation membrane specimen having a size of 200×200 mm was placed between A4 papers and allowed to stand, and then cooled at room temperature to measure lengths of the specimen shrunk in the machine direction (MD) and transverse direction (TM), and the thermal shrinkage rate was calculated using the following calculation formula. Table 4 above refers to a temperature shrinkage value at 150° C. of the separation membrane that is equal to or less than the value described.

$$\text{Thermal shrinkage rate (\%)} = \frac{l_1 - l_2}{l_1} \times 100$$

(In the above calculation formula, $l_1$ is the length in the machine or transverse direction of the specimen before shrinkage, and $l_2$ is the length in the machine or transverse directions of the specimen after shrinkage).

Moisture content (ppm): 2 g of sample was taken from the separation membrane and the moisture content was measured by the Karl Fischer method.

The foregoing description of the present invention is intended to be illustrative, and it will be understood by those skilled in the art that modifications may be readily made to other specific forms without departing from the spirit or essential characteristics of the present invention. It should therefore be understood that the embodiments described above are illustrative in all respects and not restrictive. For example, each component described as a single form may be implemented in a distributed fashion, and components described as being distributed may also be implemented in a combined fashion.

The scope of the present invention is indicated by the following claims, and all changes or modifications derived from the meaning and scope of claims and their equivalents should be construed as being included in the scope of this invention.

The invention claimed is:

1. A coating composition comprising a composite in which a dissociated natural polymer compound is bound to at least a portion of a surface of an acrylic polymer particle, wherein
    the coating composition is an aqueous coating slurry,
    the coating composition is water-soluble,
    the pH of the coating composition is in a range of 4 to 5,
    the concentration of the dissociated natural polymer compound is in a range of 1% to 10% by weight,
    the dissociated natural polymer compound is one selected from the group consisting of collagen, casein, albumin, gelatin, and a combination of two or more thereof,
    the composite is at least one of a plurality of composites in the aqueous coating slurry, and the plurality of composites are composite particles, and
    D10, D50 and D90 of the composite particles in the aqueous coating slurry are constant across said concentration range of the dissociated natural polymer compound, where Dx is a particle size value corresponding to x % of the composite particles in the aqueous coating slurry.

2. The coating composition of claim 1, wherein the solid content of the coating composition is 5 to 25% by weight.

3. A method for preparing the coating composition of claim 1, comprising:
    (a) adding water and the natural polymer compound into a reactor and adjusting the pH within the range of 4 to 5 to dissociate the natural polymer;
    (b) adding a water-soluble initiator and an acrylic monomer into the reactor, and allowing the resulting mixture to react, forming the coating composition.

4. The method of claim 3, wherein the acrylic monomer is saponified prior to the addition.

5. A separation membrane comprising a coating layer, the coating layer being formed by applying the coating composition according to claim 1 onto at least one surface of a polyolefin-based porous substrate.

6. The separation membrane according to claim 5, wherein a moisture content of the coating layer is 1,000 ppm or less.

7. The separation membrane according to claim 5, wherein a thermal shrinkage rate at 150° C. in machine and transverse directions of the separation membrane are 10.0% or less, respectively.

* * * * *